July 12, 1955
C. M. HYDE
2,712,677
PORTABLE ANIMAL SHELTER
Filed Feb. 24, 1950
2 Sheets-Sheet 1
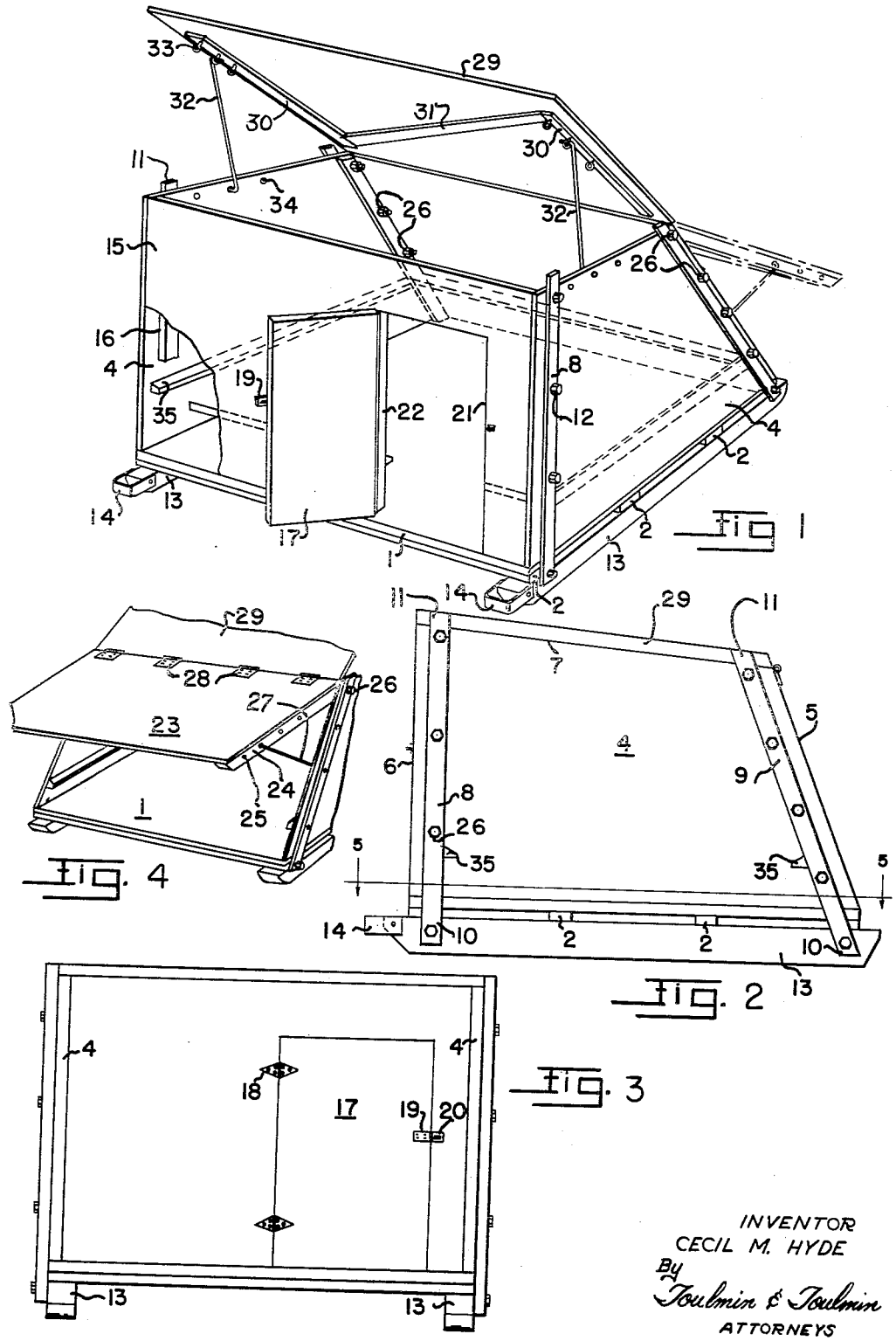
INVENTOR
CECIL M. HYDE
By
Toulmin & Toulmin
ATTORNEYS July 12, 1955  C. M. HYDE  2,712,677
PORTABLE ANIMAL SHELTER
Filed Feb. 24, 1950  2 Sheets-Sheet 2
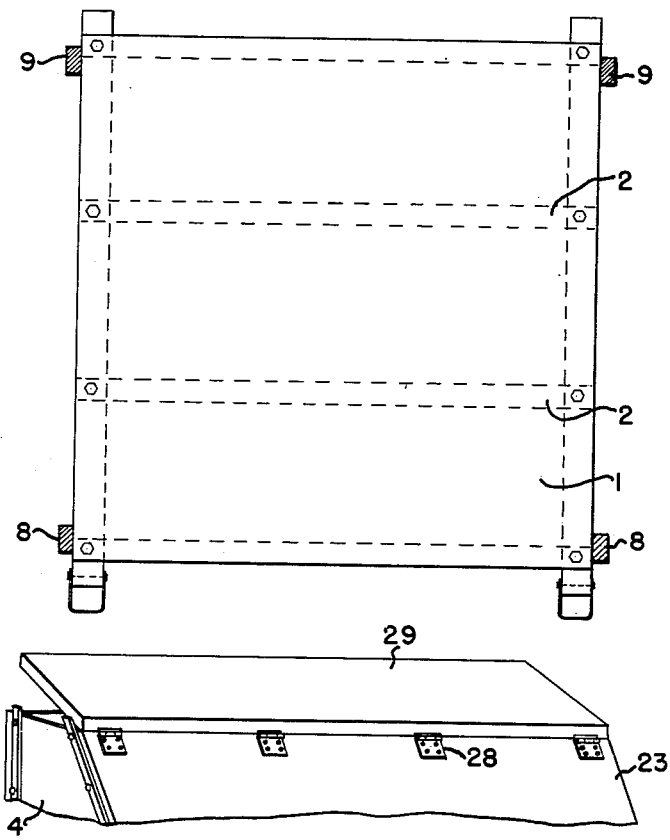
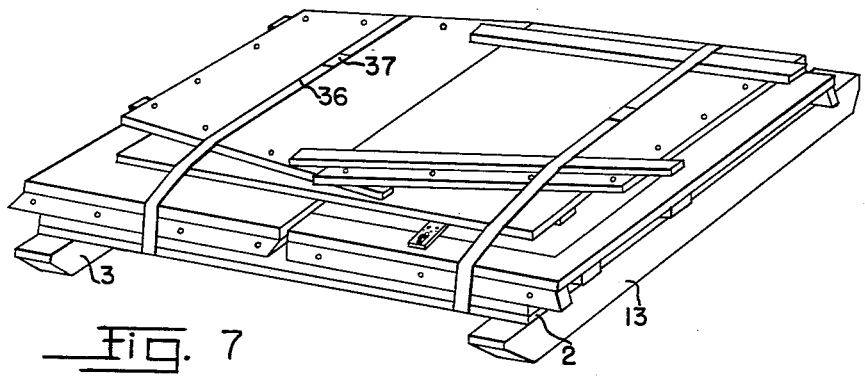
INVENTOR
CECIL M. HYDE
By Toulmin & Toulmin
ATTORNEYS

United States Patent Office 2,712,677
Patented July 12, 1955

2,712,677

PORTABLE ANIMAL SHELTER

Cecil M. Hyde, Connersville, Ind.

Application February 24, 1950, Serial No. 146,036

2 Claims. (Cl. 20—2)

The present invention relates to animal shelters, more particularly hog houses.

On the average farm, hog houses are generally made in rough-board fashion, without design or plan, and with very little comfort afforded the hog. As a result, the health of the animal and its propensity to breed often become impaired. These installations are definitely not portable but instead are fixed to the ground, so that when a new place for the hogs is indicated, the hog house must be torn down and rebuilt, again in a haphazard manner.

The primary object of the invention is to provide an animal shelter having extreme portability and made of relatively inexpensive material, so designed as to permit the erection of the shelter in place by relatively unskilled labor.

Another object is to provide an improved animal shelter of a ready-made type which can be transported in a knocked-down condition and easily erected on location by the user with ordinary tools.

Still another object is to provide a hog house made of flat, inter-fitted members, held together by detachable securing devices and capable of being erected according to a predetermined size and shape.

A further object is to provide a hog house with elements made of wood or metal and adapted to be fitted together and detachably held by bolts or screws so as to be easily erected for the first time or taken apart and reerected at a distant location.

Another object is to provide an improved animal shelter in which provision is made by its construction for ventilation and the full admission of sunshine, and is also capable of protecting the interior from rain and snow.

A still further object is to provide an animal shelter having readily erectable elements of size, shape and dimension such that the minimum material is employed and the cost correspondingly reduced.

Another object is to provide an animal shelter of the knock-down type having quadrilateral sides and a slanting roof, all constituted of flat material such as plywood, and fitted together at detachable joints.

Another object is to provide an animal shelter made of plywood or other elements with the rear side and roof hinged together to permit opening of these elements and admit air or sunlight through the top or at the rear of the shelter.

Another object is to provide a portable hog house formed of light but sturdy sides, bottom and top, the parts being detachably secured together and supported on skids.

The final object is to provide a portable hog house formed of self-supporting plywood sides and roof, detachably secured together, and in which the rear side and top portions are adapted to be lifted away from the house to afford ventilation and admission of sunlight, the rear side also serving as a shade at the back of the house.

The above objects are carried out in brief by providing flat plywood panels cut to proper size and dimension, fitted with hinges and bolt holes in predetermined places such that the house can be quickly erected on skids or wheels according to plan. By removing some of the bolts and providing detachable support bars or struts, one or more of the sides of the house and the roof can be tilted away from the frame in order to allow full access to the interior of the house and thereby admit sunlight and provide shade and ventilation.

The invention will be better understood when reference is made to the following description and accompanying drawings, in which:

Figure 1 is a perspective view of the improved animal shelter;

Figure 2 is a side elevational view;

Figure 3 represents a front elevational view of the structure;

Figure 4 is a fragmentary rear view showing the manner in which the rear side of the house can be lifted to provide additional ventilation and shade;

Figure 5 is a sectional view taken at the line 5—5 in Figure 2 and showing the platform or bottom of the house with the cross braces in place;

Figure 6 is a fragmentary view in perspective of the top portion of the hog house with the lid or roof tilted upwardly; and Figure 7 represents a perspective view showing the parts of the improved hog house in a knocked-down condition ready for shipment.

The animal shelter, improved in accordance with the principle of the invention, comprises a four-sided compartment, although it must be understood that other shapes may be employed. The side walls and the top member are made preferably of plywood of any suitable type, and constituted of at least a plurality of layers and having an overall thickness of about 3/8". The bottom member is also constituted of plywood, preferably thicker than the sides and having greater strength, the overall thickness being approximately 1/2".

The bottom portion 1 preferably comprises a square member, i. e. having the same dimensions on all sides, and is constituted of any inflexible, tough, hard-wearing material such as plywood. The lowermost ply is traversed by a plurality of braces 2, equally spaced and extending preferably cross-wise of the grain of the ply. These braces rest at each end on a pair of skids 13, preferably made of hardwood, relatively thick, so as to spread the pressure of the house and the contained animals over a large surface.

The sides of the house indicated at 4 extend upwardly from the bottom or platform 1 and are quadrilateral in shape and one edge indicated at 5 tapers inwardly toward the other edge indicated at 6 (Fig. 2), and the top edge 7 of each side tapers slightly upward from the upper end of the edge 5 toward the upper end of the edge 6. These sides are strengthened in the vertical direction by a pair of braces 8, 9, the brace 8 being vertically parallel to the edge 6 and the brace 9 inclining at an angle to be parallel to the edge 5. These braces are of longer length than the height of the side 4 so as to leave extending portions 10 at the bottom and portions 11 at the top. The braces 8 and 9 are secured to the sides 4, preferably by screws (not shown) and the entire side assembly is secured to the front and back elements of the hog house by bolts 12 and 26.

The cross braces 2 rest at each end on skids 13, these skids having a somewhat longer length than the length of the wall 4, and the latter is secured to the skid by a bolt or screw which passes through the lower portions 10 of the braces 8, 9. These braces, therefore, constitute the sole means of securing the walls 4 to the skids 13. This arrangement offers facility in erecting or reerecting the hog house and at the same time provides all the strength necessary to fix the hog house as a whole to the skids. The latter are made of wood, reasonably tough and fairly thick, so as to distribute the weight of the hog house over a comparatively large area and thereby prevent miring the house in soft ground. However, the skids are sufficiently thin so as to introduce no excessive friction whereby the house can be readily moved by horse or automotive force. Any suitable type of hitch 14 may be attached to the front edge 10 of each skid.

The front wall 15 of the house is also comprised of plywood, preferably three plies, and is inserted between the inner edge surfaces of the side walls 4. The front wall is reinforced at the two side edges by a pair of braces 16 which are permanently secured as by nails or screws (not shown) to the inner surface of the wall. These braces are preferably of greater width and thickness so that when the front wall is in place the braces will correspond in position exactly opposite from the front braces 8 of the side walls and the bolts 12 then pass through these inner braces 16 and hold the front wall in position with respect to the side walls.

A door 17 mounted on hinges 18 may be arranged in the front wall 15 and any suitable kind of fastener such as lock strap 19 and clasp 20 provided. The edges of the door opening 21 can be reinforced, if desired, by braces 22 of wood which are fixedly secured to the interior surface of the wall 15 by nails or screws (not shown).

The rear wall 24 of the house is constituted of plywood and has vertical braces along the two outer edges. These braces are provided with openings 25, four as shown, for receiving bolts or screws 26 which pass through the braces 9 of the side walls and thus hold the rear wall in position. However, provision is made for tilting the rear wall upwardly when desired, as for example, in the summer in order to increase the ventilation through the hog house and provide shade. For this purpose the central three bolts 26 are removed, leaving only the upper bolt in place, as shown in Figure 4. Under these circumstances the wall 23 can pivot or swivel around these two uppermost bolts 26 to leave a space of any desired size between the wall and the bottom or floor portion 1 of the house.

The angle to which the rear wall 23 can be tilted upwardly is determined by means of a pair of rods 27 at each side edge of the wall, this rod having a hook at each end, one of which is adapted to be inserted into one of the openings 25 and the other hook being adapted to be received in the opening vacated by one of the three intermediate bolts 26. It will be noted that when the rear wall 23 is in a tilted position as shown in Fig. 4, there are only two bolts passing through each brace 9, the uppermost and lowermost bolt. But these two bolts are sufficient to hold the side walls 4 secure to the skids 13.

While under normal circumstances, it is usually desirable to raise the rear wall to provide necessary shade, it is to be understood that if desired the front wall 15 may also be raised to the horizontal or any other position and suitably held in that position by rods similar to rods 27. It would simply be necessary to remove the center two bolts 12 in each of the braces 8 and allow the front wall 15 to swing about the uppermost bolt 12 at each end of the hog house. Thus it is possible to provide shade at the rear and the front of the hog house and thereby provide increased protection from the sun for the animals.

The upper edge of the rear wall 23 is provided with a plurality of hinges 28, four as shown, for securement with the top or cover 29 of the house. This top member is constituted of plywood and may, if desired, be provided with any suitable type of gutter or rain deflector, but in general I have found that a plain flat surface is sufficient. On the inner surface the top is provided with a system of braces indicated at 30 which conform, generally speaking, to the shape of a large letter N, the legs of which are parallel along the ends of the top portion and inter-connected by a diagonal brace 31.

These braces may be constituted of wood and permanently secured as by nails or screws (not shown) to the top member. This top member is adapted to be tilted upwardly at the hinges 28 to any desired height in order to admit maximum sunlight or to obtain necessary ventilation, while at the same time serving as a roof or protection against the elements. The angle at which this top member can be tilted is determined by a pair of rods 32 having oppositely extending hooks at the ends. The opposite hook portion is adapted to be received by one of the several holes or eyelets 33 screwed into the parallel braces 30 and the hook portion of the rod 32 is received by one of the openings 34 provided near the upper edges of the side walls 4.

When the top member 29 is let down to its closed position the side edges will fit snugly within the portions 11 of the vertical braces 8 of the side walls so that rigidity is provided for the top member at the front edge in the transverse direction. It has been explained that the upper edge 7 of the side walls has a slight slant toward the rear of the hog house so that when the top member or roof 29 is let down and rests upon the top, edges of the front, side and rear walls of the house, the roof will conform to a slant rearward so as, readily, to shed water.

The interior of the hog house is bare except that there is a so-called pig rail 35 extending around all sides of the house and may extend across the door 17 if desired. This rail is of the conventional type, constituted of wood, and in general protects the young pigs from being crushed or suffocated by the body of the mother.

It is evident that since all the corners or joints between the walls, the floor or platform and the roof are formed by bolts, screws or other types of detachable elements, the main structural portions of the house can be knocked down to a perfectly flat condition as shown in Figure 7 and shipped in this manner in order to conserve shipping space. The combination of the skids 13, braces 2 and floor 1 constitute an excellent support for the parts in the knocked-down condition and the braces 2, 8 and 9 assist in giving rigidity to the knocked-down structure as a whole. The various parts can be secured together for shipment in any suitable manner, for example by means of a pair of flexible straps 36 and a fastener 37.

It is evident from the foregoing that I have disclosed an improved hog house which has extreme portability both in the knocked-down condition as shown in Fig. 7 for shipment, and also after it has been erected as illustrated in Fig. 1. The main parts of the hog house can be readily placed in position by unskilled labor because all the tools that are necessary is simply a wrench or wrenches for tightening the bolts to the various braces. The house can be readily moved across the fields on account of the skids 13, or if necessary, knocked down and reerected. The plywood walls, roof and bottom members are sturdy and of light weight due to the plywood, but it is obvious that if desired the house, including the reinforcing cleats or braces, can be made of metal, particularly of aluminum.

It will be noted that the bottom of the house is maintained a distance above the ground by reason of the skids and there are air spaces left on each side of the braces 2 between the platform 1 and the upper surface of the skids. Thus all parts of the platform can be kept relatively dry and with free circulation of air, both inside and out. This air circulation can be increased by opening the door 17 and tilting the rear wall 23 upwardly to allow a clean sweep of the wind through the house. When the rear wall 23 is lifted to its highest position, i. e. to a horizontal position, and held by suitably arranging the retaining rods 27, the wall becomes a sunshade for the hogs who may desire to lie down or wallow outside of the house. Thus the interior of the hog house will remain substantially cool in summner and when closed tight by swinging the rear wall 23 downward and fastening the same at the bolts 26, also dropping the roof 29 into place and closing the door 17, the house will remain reasonably warm in the winter.

It is apparent that the quadrilateral shape of the side walls permits the use of minimum material because the house is given a considerable depth of space at the bottom where such space is utilized by the animals and the upward taper does not detract from this useful space but does save considerable material.

The materials of the hog house can be protected from the weather and, if desired, made ornamental, by the use of paints, or can be red-leaded, oiled or stained. This external treatment can be done either by the farmer on location or the parts can be thus treated and shipped in that condition.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. An animal shelter comprising a bottom member of rectangular configuration, oppositely disposed side walls each having a quadrilateral shape, said side walls having front edges with a greater vertical height than the rear edges thereof, front and rear walls having rectangular configuration and mounted between said side walls, said front wall being vertical and said rear wall converging toward said front wall, detachable elements fastening said front wall to said side walls, said rear wall having flange means along the lateral edges thereof engaging said side walls, a series of additional detachable elements spaced along the length of said flange means and directed through openings in said side walls and said flange means, one of said additional detachable elements being located at the upper ends of said flange means whereby on the removal of the other said additional elements said rear wall may be pivoted about its upper edge, and a top member pivotally mounted on the upper edge of said rear wall.

2. An animal shelter as claimed in claim 1, with braces on the exterior faces of said side walls adjacent the rear edges thereof, said additional detachable elements being directed through openings in said braces to fasten said rear wall to said side walls.

References Cited in the file of this patent

UNITED STATES PATENTS

| | | |
|---|---|---|
| 852,769 | Campbell | May 7, 1907 |
| 917,862 | Hallar | Apr. 13, 1909 |
| 1,101,418 | Eichhorn | June 23, 1914 |
| 1,272,823 | McCarthy | July 16, 1918 |
| 1,371,950 | Tracy | Mar. 15, 1921 |
| 1,500,266 | Primm, Sr. | July 8, 1924 |
| 1,743,603 | Heizenreter | Jan. 14, 1930 |
| 1,875,433 | Fitzpatrick | Sept. 6, 1932 |
| 2,092,155 | Hackett | Sept. 7, 1937 |
| 2,335,708 | Strobel | Nov. 30, 1943 |
| 2,410,221 | Latura | Oct. 29, 1946 |
| 2,445,055 | Capaul | July 13, 1948 |
| 2,498,411 | Geib | Feb. 21, 1950 |
| 2,532,830 | Barnhart et al. | Dec. 5, 1950 |

FOREIGN PATENTS

| | | |
|---|---|---|
| 153,426 | Great Britain | of 1920 |